Nov. 11, 1952     A. E. LINDNER ET AL     2,617,146
MEAT GUIDE FOR MEAT TENDERIZING MACHINES
Filed Dec. 28, 1948
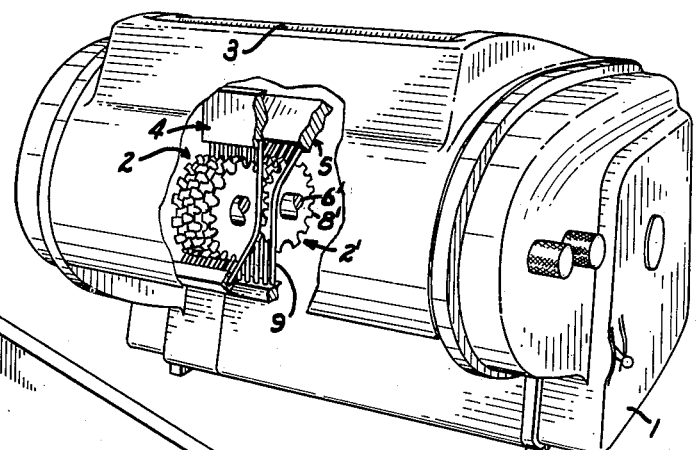
Fig. I
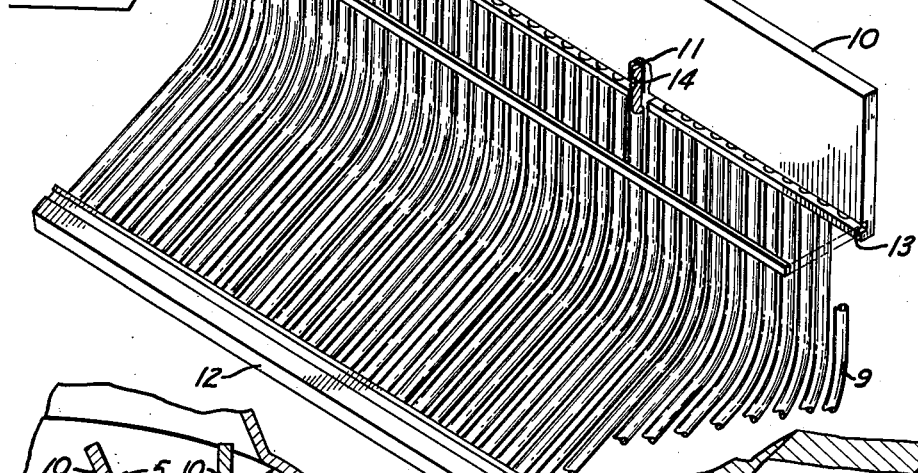
Fig. II
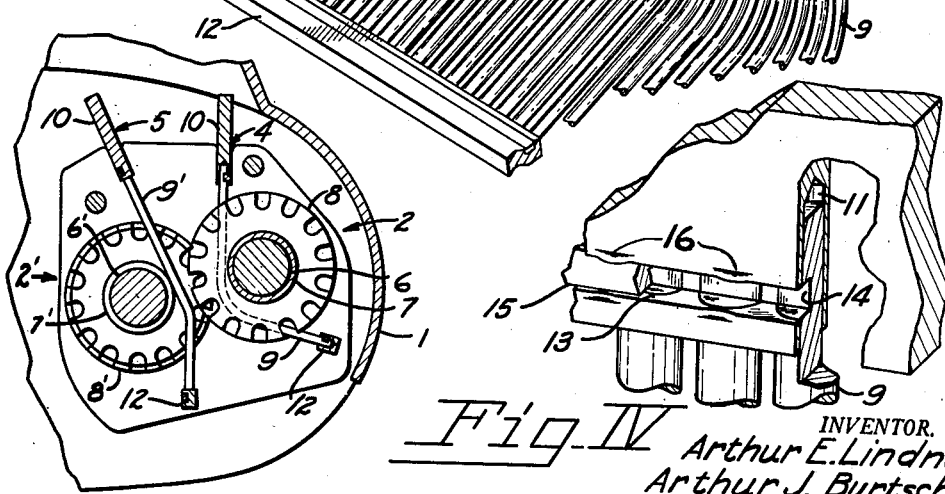
Fig. III
Fig. IV
INVENTOR.
Arthur E. Lindner
Arthur J. Burtscher
BY Marshall, Marshall & Leonard
ATTORNEYS Patented Nov. 11, 1952

2,617,146

UNITED STATES PATENT OFFICE 2,617,146

MEAT GUIDE FOR MEAT TENDERIZING MACHINES

Arthur E. Lindner and Arthur J. Burtscher, Toledo, Ohio, assignors to Toledo Scale Company, Toledo, Ohio, a corporation of New Jersey Application December 28, 1948, Serial No. 67,652

1 Claim. (Cl. 17—26)

This invention relates to meat tenderizing machines and, more particularly, to meat guides for such machines.

In many meat tenderizing machines having parallel meat tenderizing rolls each of which consists of a plurality of spaced disk-like knives, comb-like means are provided which extend between the parallel tenderizing rolls and which have tine-like elements extending between adjacent ones of the spaced disk-like cutting knives. The function of these meat guides is to prevent meat from being mashed into the spaces between the knives and to peel the meat away from the knives after it has passed between the knives.

The conventional guide members consist of one or more crossbars and a plurality of parallelly extending resilient wires or tines. Each of the wires or tines must be mounted in the cross-bar. In the art this has usually been accomplished by drilling a series of parallel holes in the crossbar, inserting the ends of the guide wires or tines, and soldering the wires in place. This operation is extremely difficult because in modern equipment both the bar and the wires usually are chromium plated or stainless steel so that they will not be deleteriously effected by acids and juices of the meat. Soldering or welding either chromium plated material or stainless steel material is an extremely difficult and costly operation, usually requiring the employment of silver solder. Furthermore, with the considerable number of tines or wires in each comb, it is difficult to insure that each will be securely anchored by the soldering operation.

It is the principal object of this invention to provide a meat guide for a steak tenderizing machine or a similar article in which the tine-like elements are secured in the crossbar mechanically.

It is another object of this invention to provide a process for the construction and assembly of comb-like structures in which the various parts are secured one to the other by purely mechanical means.

These and more specific objects and advantages will be apparent from the drawings, in which Figure I is a view in perspective of a meat tenderizing machine with a portion of the cover broken away to show the conventional interior arrangement of parallel meat tenderizing rolls equipped with spaced, disk-like knives and comb-like meat guiding structures.

Figure II is a fragmentary vertical sectional view at enlarged scale looking toward the right in the broken away section of Figure I and taken on a plane transverse to the axes of the tenderizing rolls to show the meat guiding structures embodying the invention.

Figure III is a greatly enlarged isometric view of a meat guiding structure constructed in accordance with this invention.

Figure IV is a further enlarged fragmentary broken detail view illustrating the precise construction of the elements of the meat guides shown in Figure III.

A meat tenderizing machine such as is used in restaurants or meat markets for tenderizing meat, usually consists of a housing 1 in which are mounted an electric motor and drive gear (not shown) operatively connected to and rotating a pair of tenderizing rolls 2, 2' in opposite directions. Meat to be tenderized is inserted into the machine through a slot 3 and passes downward between a pair of meat guiding structures 4 and 5 between the two tenderizing rolls 2, 2', emerging at the lower portion of the machine.

The meat tenderizing rolls 2 and 2' (see Figure II) consist of shafts 6 and 6' respectively on which are alternately mounted a plurality of spacing collars 7 and 7' respectively and disk-like knives 8 and 8' respectively. The knives 8 and 8' overlap and are interdigitated in the space between the tenderizing rolls. Each of the tenderizing rolls has associated with it a meat guiding structure, one of the meat guiding structures 4 or 5, the guide wires 9 and 9' of which extend downwardly between adjacent pairs of tenderizing knives 8 and 8' emerging beneath the tenderizing rolls for guiding meat between the rolls and out of the rolls.

The meat guiding structure 4 embodying the invention consists of a relatively heavy crossbar 10 in one edge of which are drilled a plurality of spaced, parallel, transversely extending bores 11 of a diameter substantially identical with the diameter of the guide wires or tines 9. Such a meat guide is preferably but not necessarily equipped with a bottom bar 12 similarly drilled with a plurality of bores. Each of the guide wires 9 is inserted into one of the bores 11 in the bar 10, and, if a second bar 12 is employed, also into the corresponding bores in that bar. After the guide wires or tines 9 are thus inserted into the bores and the entire structure comprising the crossbar 10 and bottom bar 12 (if used) and the plurality of guide wires or tines 9 is "squared up," the assembled structure is placed in a jig or fixture and held tightly in place to prevent relative movement of the parts. A slot 13 is then milled longitudinally along the bar to a depth such that the milling cutter also cuts notches 14 in the guide wires or tines 9. As can best be seen by reference to Figure IV, the slot 13 and notches 14 cut through the guide wires or tines only about half way. By so milling the slot and notches in a single operation they are, of course, of the same dimensions. The assemblage of the backbar 10 and the plurality of guide wires or tines 9 is securely locked together and the subsequent removal of any of the guide wires or tines 9 prevented by the insertion of a single locking member or key 15 into the slot 13. The key 15 may be a tight "force fit" or it may be secured in place as by "staking" as indicated by the reference numeral 16 in Figure IV. If this positive way of retaining the key in place is employed, the thickness of the key should be a few thousandths less than the depth of the slot 13, to permit the overlay of the swaged metal.

This construction eliminates the costly, tedious and much less than satisfactory silver soldering step almost universally employed in the art for the construction of comb-like members either for use as guide means in meat tenderizing machines or for other uses such as cutting cakes (in which case the tines are straight and secured at only one end) and for similar purposes. The embodiment of the invention which has been described may be modified by shaping the tines or guide wires and/or the cross bars or backs of the structures in many different manners to create structures for many different usages; the heart of the invention lying in the assembly and locking means disclosed.

Having described the invention, we claim:

A comb-like structure comprising, in combination, a backbar, said bar having a plurality of spaced, parallel transversely extending bores along one of its edges and a longitudinally extending slot in a surface of said bar and intersecting at least some of said bores, a plurality of tine-like elements, one end of each of said elements extending into one of said bores, at least some of said elements having transverse slots coextensive with and in line with the slot in said bar when the elements are inserted in the bores and a locking key that fits without clearance in said slots and extends substantially the length of said bar for locking said elements in said bar.

ARTHUR E. LINDNER.
ARTHUR J. BURTSCHER.

REFERENCES CITED

The following references are of record in the file of this patent:

UNITED STATES PATENTS

| Number | Name | Date |
| --- | --- | --- |
| 1,376,150 | Miller | Apr. 26, 1921 |
| 1,697,289 | Rocquin | Jan. 1, 1929 |
| 1,791,680 | Miller | Feb. 10, 1931 |
| 2,216,898 | Awbrey | Oct. 8, 1940 |
| 2,218,953 | Gustafson | Oct. 22, 1940 |
| 2,437,069 | Brownsey | Mar. 2, 1948 |
| 2,472,800 | Ahrndt | June 14, 1949 |

FOREIGN PATENTS

| Number | Country | Date |
| --- | --- | --- |
| 61,045 | Norway | June 26, 1939 |